J. O. MOOK.
TRACTION ATTACHMENT FOR AUTOMOBILES.
APPLICATION FILED APR. 7, 1919.

1,349,083.

Patented Aug. 10, 1920.

Fig. 1

Fig. 2

Witnesses:
Andrew Wintercorn
Robert F. Bracke

Inventor
Joseph O. Mook
By Williams, Bradbury & Lee
attys.

UNITED STATES PATENT OFFICE.

JOSEPH O. MOOK, OF KANKAKEE, ILLINOIS.

TRACTION ATTACHMENT FOR AUTOMOBILES.

1,349,083. Specification of Letters Patent. Patented Aug. 10, 1920.

Application filed April 7, 1919. Serial No. 288,127.

*To all whom it may concern:*

Be it known that I, JOSEPH O. MOOK, a citizen of the United States, residing at Kankakee, in the county of Kankakee and State of Illinois, have invented a certain new and useful Improvement in Traction Attachments for Automobiles, of which the following is a full, clear, concise, and exact description, reference being had to the accompanying drawings, forming a part of this specification.

My invention relates to attachments for wheels of self-propelled vehicles, and has for its general object the provision of a simple and inexpensive attachment which can be easily and quickly applied to the wheels for the purpose of increasing the traction power thereof in emergencies.

It is a common occurrence for the wheels of an automobile to become mired in a mud hole in traveling over bad roads or soft ground, notwithstanding the fact that they may be equipped with chains or other anti-skid devices which function properly on dry ground but which have no grip in soft mud. To take care of this emergency, several attempts have been made to provide a wheel attachment which will give to the wheel enough traction power to enable the vehicle to propel itself out of the depression, but so far as I am aware, these attempts have failed because of faulty conformation given to the attachment.

The successful operation of my device I attribute to the use of several relatively long ground-engaging projections or lugs which are carried by the attachment or shoe arranged to be clamped to the vehicle wheel.

A further object of my invention resides in the provision of simple and effective means for locking the attachment in place on the vehicle wheel.

These and other objects of my invention will be pointed out in detail in connection with the accompanying drawings, wherein:

Figure 1 is a fragmentary side elevational view showing the attachment of my invention applied to a vehicle wheel, the shoe being shown partly in section to more clearly reveal its construction; and Fig. 2 is a cross-sectional view of Fig. 1, taken along the line 2—2 and looking in the direction indicated by the arrows.

Similar characters of reference refer to similar parts in the views.

Referring first to Fig. 1, 3 designates a vehicle wheel which may be of any type and which comprises the felly 4, spokes 5, 5, and tire 6. Arranged for attachment on the periphery of the vehicle wheel is the traction attachment 7, which comprises a shoe 8 arranged to be held in place on the vehicle wheel by the flexible elements 9 and 10, one disposed at each end of the shoe 8. The inner face 10' of the shoe is longitudinally grooved, as most clearly shown in Fig. 2, to receive the vehicle tire, and assumes the shape of an arc, such that it may snugly fit the vehicle tire. The outer face 11 of the shoe is preferably formed concentric with the inner face. Extending from the outer face of the shoe are four relatively long ground-engaging lugs or projections 12, 12, each of which extends laterally substantially the entire width of the shoe.

Each of the flexible locking elements 9 and 10 comprises a chain 13 having a point intermediate its ends attached to the outer face 11 of the shoe by a rivet or other suitable means 14. One end of the chain is connected by a link 15 to a locking lever 16, the connection between the link and locking lever being afforded by the pivot pin 17. Carried by the locking lever 16, and at the end thereof, opposite the finger piece 18, is a pivot pin 19 arranged for engagement with any one of several notches formed in the locking plate 20, attached to the opposite end of the chain 13 at 21. The end of the locking plate 20, attached to the chain, carries a hooked projection 22 arranged to receive any one of several links of the chain, so that the effective length of the chain may be varied to suit the particular wheel to which the attachment of my invention is to be clamped.

The lever 16 when locked is held in this position by reason of the fact that the pivot pin 17 lies inside of the pivot pin 19. With this arrangement, there is a tendency to move the locking lever 16 in a clockwise direction (Fig. 2), and thus to maintain it in its locked position. Attention is directed to the fact that no strain is placed upon the rivet 14, which holds the chain to the traction shoe, because the chain extends entirely around the shoe and thus places all of the clamping stress on the outer face thereof. The several ground-engaging projections 12, 12 are spaced far enough apart so as to prevent the accumulation of dirt and mud between the projections, which would thereby render the attachment ineffective. On the other hand, the projections are spaced in close enough relation so that the wheel may obtain proper traction to permit the vehicle to propel itself from the depression.

Although the device of my invention is intended primarily only to be used when the vehicle is mired in a mudhole, it can, of course, be used continually where the automobile is required to pass over a road which is particularly marshy and soft for a considerable distance.

Having thus described my invention, what I claim as new and desire to secure by Letters Patent of the United States is:—

The combination with a traction element for a vehicle wheel, of means for securing said traction element to a wheel, comprising a locking plate having a hook formed adjacent one end and a plurality of spaced notches formed longitudinally thereof, a locking lever having a transverse projection adjacent one end for adjustable engagement with said notches, and a chain the links at one end of which can be adjustably engaged with said hook, the other end of said chain being connected with said locking lever intermediate the ends thereof, the notches of said locking plate being spaced apart a distance less than the length of the links of said chain.

In witness whereof I hereunto subscribe my name this 3d day of April, 1919.

JOSEPH O. MOOK.

Witnesses:
 A. E. STARZINGER,
 G. E. HILSMANN.